July 28, 1970 H. S. FALL ET AL 3,521,939

STOP SYSTEM

Filed Feb. 23, 1968 7 Sheets-Sheet 1

INVENTORS
HERBERT S. FALL
LAWRENCE M. VAUGHN
BY
Hood, Gust & Irish
ATTORNEYS

INVENTORS
HERBERT S. FALL
LAWRENCE M. VAUGHN
BY
Hood, Gust & Irish
ATTORNEYS

INVENTORS
HERBERT S. FALL
LAWRENCE M. VAUGHN
BY
Hood, Gust & Irish
ATTORNEYS

STOP SYSTEM

Filed Feb. 23, 1968 7 Sheets-Sheet 4

INVENTORS
HERBERT S. FALL
LAWRENCE M. VAUGHN
BY
Hood, Gust & Irish
ATTORNEYS

STOP SYSTEM

Filed Feb. 23, 1968 7 Sheets-Sheet 5

INVENTORS
HERBERT S. FALL
LAWRENCE M. VAUGHN
BY
Hood, Gust & Irish
ATTORNEYS

July 28, 1970 H. S. FALL ET AL 3,521,939

STOP SYSTEM

Filed Feb. 23, 1968 7 Sheets-Sheet 6

INVENTORS
HERBERT S. FALL
LAWRENCE M. VAUGHN
BY
Hood, Gust & Irish
ATTORNEYS

INVENTORS
HERBERT S. FALL
LAWRENCE M. VAUGHN
BY
Hood, Gust & Irish
ATTORNEYS

United States Patent Office 3,521,939
Patented July 28, 1970

3,521,939

STOP SYSTEM

Herbert S. Fall, 6248 E. Iona St., Indianapolis, Ind. 46203, and Lawrence M. Vaughn, Acton, Ind.; said Vaughn assignor to said Fall Filed Feb. 23, 1968, Ser. No. 707,759
Int. Cl. A47b *88/16*
U.S. Cl. 312—348 4 Claims

ABSTRACT OF THE DISCLOSURE

For use with a drawer or platform assembly slidably mounted in a cabinet or support structure, which assembly includes a handle movable between an assembly-arresting position and an assembly-releasing position, means for stopping such an assembly in any position along its path of movement, the stopping means comprising first means adapted to be connected to such a cabinet or support structure and second means adapted to be connected to such an assembly for movement therewith, the second means being movable in a predetermined path relative to the first means, and third means for preventing relative movement between the first and second means thereby to stop such an assembly, the third means being operatively connected between the first and second means and effective, when actuated, to stop the second means in any position along its path. Means for actuating the third means to stop the second means is provided, the actuating means being adapted to be operatively connected to such a handle so that, only when said handle is in its arresting position, the third means will stop the second means.

It is a primary object of our invention to provide means for stopping an extensible drawer or platform assembly in any position along its path, which means is actuated by manually-operated means, such as a handle, carried on the assembly. Our system comprises first means adapted to be connected to a cabinet and second means adapted to be connected to a drawer assembly for movement therewith, the second means being movable in a predetermined path relative to the first means, and third means for preventing relative movement between the first and second means thereby to stop the drawer assembly. We have arranged our third means so that it is actuated by movement of the manually-operable means on the drawer assembly.

Another object of our invention is to provide such a stop means wherein the first means comprises a first rod-like member and the second means comprises a second rod-like member, and further comprising an elongated enclosure telescopically receiving the members, rotor means journalled at each end of the enclosure, and endless means trained about the rotor means. We connect the first member to one run of the endless means and the second member to the opposite run of the endless means so that movement of the second member produces a corresponding movement of the enclosure relative to the first member. In order to stop movement of the second member relative to the first member, a brake is carried by the second member and arranged frictionally to engage the enclosure and a cam rod is provided for moving the brake into such engagement with the enclosure, the cam rod being operatively connected to the manually-operable means for movement thereby.

Still another object of our invention is to provide such a stop means wherein the first means comprises a first piston and piston rod, wherein the second means comprises a second piston and piston rod and further comprising a cylinder telescopically receiving each of the pistons and its piston rod, means for holding the cylinders in a parallel, side by side relationship, and means defining fluid passages between adjacent ends of the cylinders whereby, when the cylinders are filled with fluid, movement of the second piston causes movement of the cylinders relative to the first piston. In this embodiment, in order to stop movement of the second piston relative to the first piston, we have provided valve means effective, when actuated, to stop fluid flow between the cylinders, thereby to stop movement of the pistons in the cylinders. Such a valve means may be operated by a solenoid which is energized and deenergized by a switch arranged to be opened and closed by movement of the manually-operable means or by a cam rod such as that discussed previously.

Still a further object of our invention is to provide such a stop means wherein the first means comprises a first piston and piston rod, wherein the second means comprises a second piston and piston rod, each piston and its piston rod being telescopically received in a cylinder, and comprising means for holding the cylinders in a side by side relationship, and means providing fluid passages between adjacent ends of the cylinders whereby, when the cylinders are filled with a fluid, movement of the second piston causes movement of the cylinders relative to the first piston. In such an embodiment, we stop relative movement of the pistons by filling the cylinders with a hydraulic fluid which is filled with magnetic metal particles, placing a coil about each cylinder and arranging switch means to connect the coils to an electrical power source, the switch means being disposed to be operated by movement of the manually-operable means. The coils are effective, when energized, to arrange the particles in such a manner as to restrain the pistons from moving in the cylinders.

It is yet another object of our invention to provide such a stop means wherein the first means is a first rod-like member, the second means is a second rod-like member, and further comprising means defining a closed loop track, a plurality of balls rollably carried in the track and completely filling the track so that movement of one ball will cause corresponding movement of all of the balls, one run of the track being generally parallel with the first member and a second run of the track being generally parallel with the second member. Means carried by the first member extends into the said one run into the path of the balls and means carried by the second member extends into the said second run into the path of the balls whereby movement of the second member causes movement of the track defining means relative to the first member. In this embodiment, in order to stop movement of the second member relative to the first member, we provide means for stopping movement of the balls in the track. Such means may comprise wedge means arranged for movement into the track to engage and stop the balls, spring means for urging the wedge means out of the path of the balls, and a cam rod, such as the previously mentioned cam rods, arranged to move the wedge means into the path of the balls, the cam rod being operated by movement of the manually-operable means.

Still another object of our invention is to provide such stop means operatively connected to the track means which slidably supports the drawer. In connection with this object, we have provided a track means comprising an outer U-shaped track member, an intermediate U-shaped track member telescopically disposed in the outer track member, and an inner U-shaped track member telescopically disposed in the intermediate track member and have arranged our stop means to stop the movement of the inner track member relative to the outer track member. Further, we have arranged the various embodiments of our stop means so that they can be telescopically disposed in the center opening of the inner track member, thereby to provide means for movably supporting the drawer as well as means for stopping the drawer in any position along its path of movement.

Other objects and features of our invention will become apparent as this description progresses.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Figures 1, 2, 3:
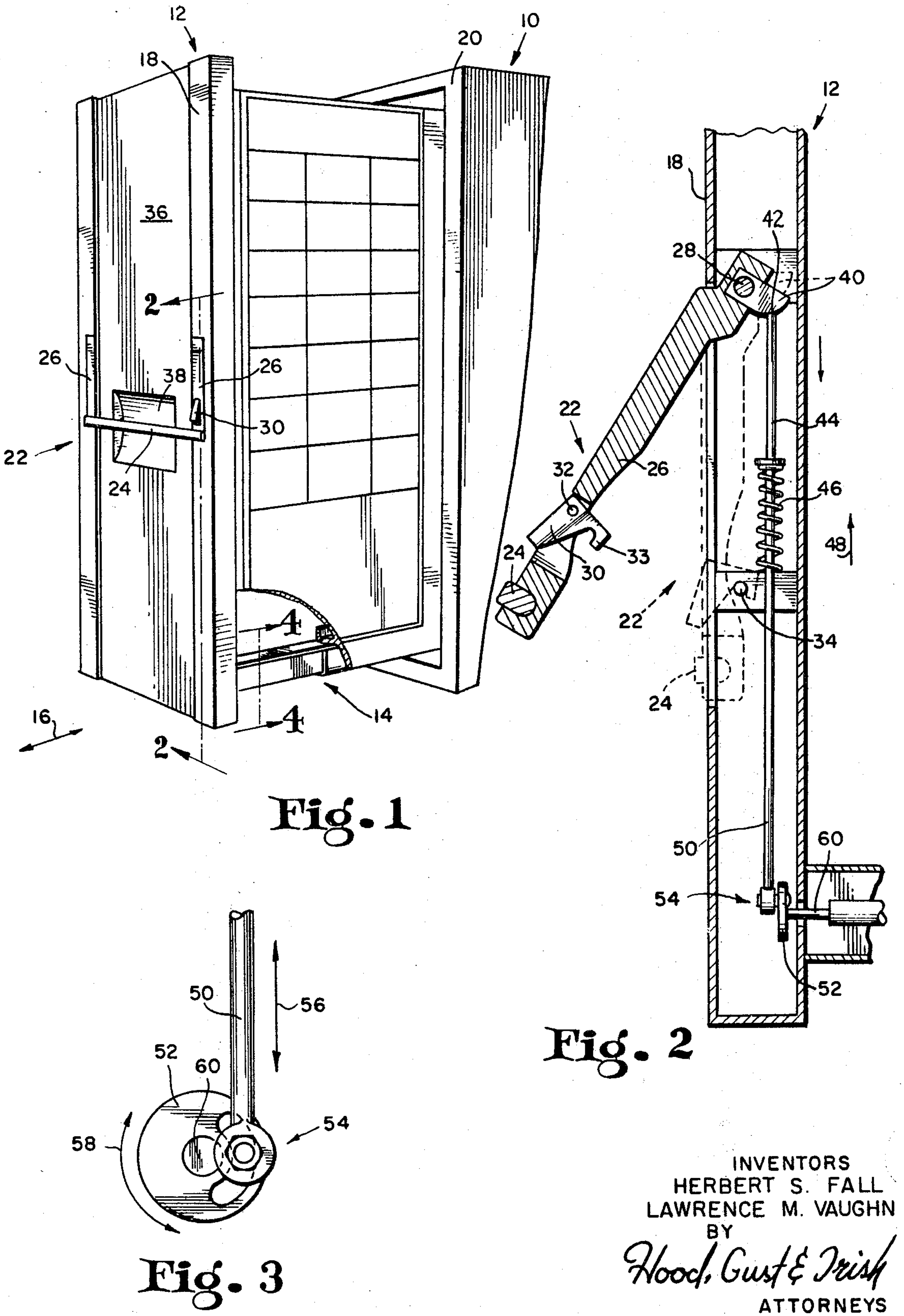
FIG. 1 is a fragmentary, perspective view, partially cut away, showing an assembly extended from its support structure.
FIG. 2 is an enlarged, fragmentary sectional view taken from FIG. 1 generally along the line 2—2 and showing means for operatively connecting the handle of the assembly to various embodiments of our stop means.
FIG. 3 is an enlarged, fragmentary view showing means for converting reciprocating motion of a portion of the arresting assembly to a rocking motion.
Figures 8, 9:
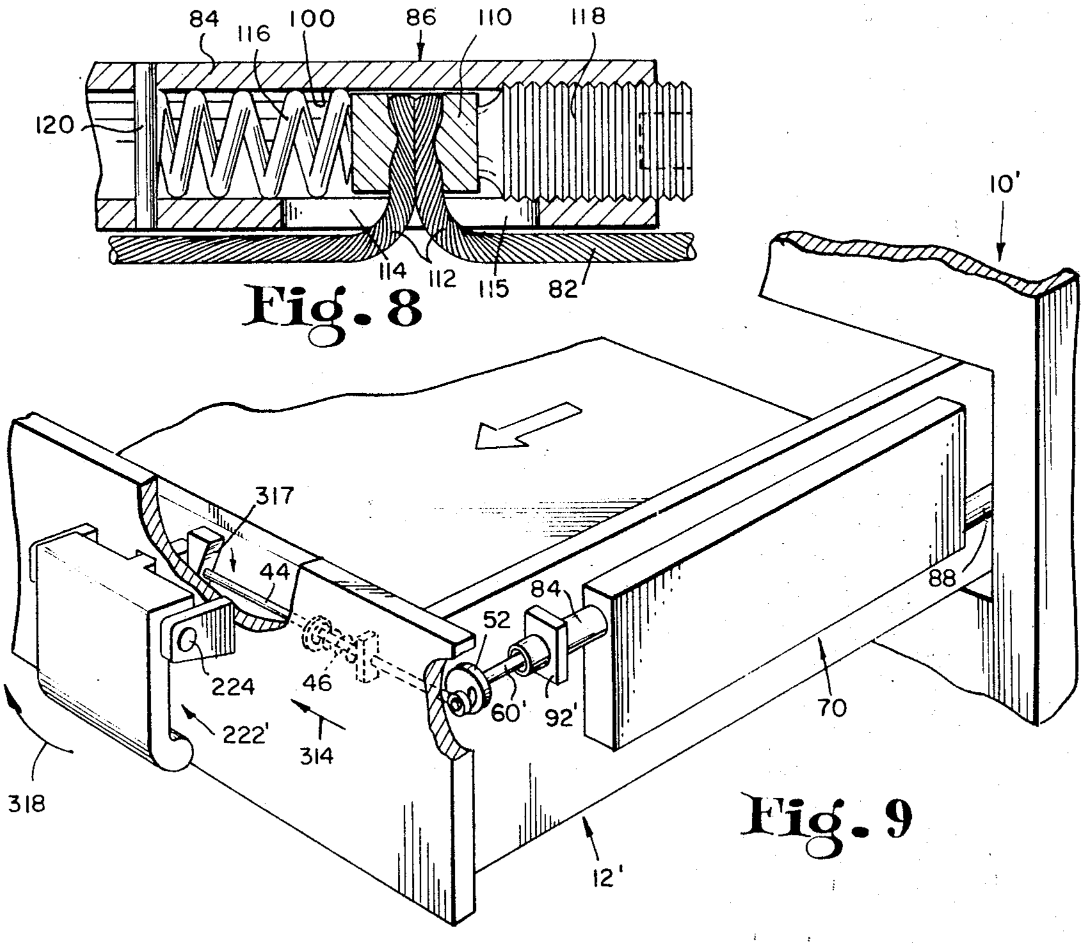
FIG. 8 is an enlarged, fragmentary, sectional view showing means for adjusting the position of the extensible members relative to the cable.
FIG. 9 is a fragmentary, perspective view showing our stop means connected to a conventional drawer which is supported for sliding movement from a cabinet.

Referring now to the drawings, and particularly to FIG. 1, it will be seen that we have illustrated a cabinet or support structure 10 from which a drawer or platform assembly 12 is movably supported. Our invention is not limited to stopping the movement of a drawer which is mounted in a cabinet and may be used to stop the movement of any element relative to a support structure. however, in order to facilitate this description, we will refer to the movable means as a drawer 12 and the support structure as a cabinet 10. In FIG. 9, we have illustrated a drawer 12' of the type which is conventionally used to support electronic equipment, the drawer being slidably mounted in a cabinet 10'.

The drawer 12 (FIG. 1) is supported on a pair of chassis tracks 14, only one of which is shown, for reciprocation in the direction of the arrow 16 relative to the cabinet 10. When the drawer 12 is fully retracted, the front frame assembly 18 thereof is against, or flush with, the front face 20 of the cabinet 10.

A stop actuator assembly 22 (best shown in FIG. 2) is carried on the frame assembly 18, the assembly 22 comprising a horizontal extending bar 24 supported at its ends by levers 26 which are pivotally mounted on the frame assembly 18 by means of pins 28, only one of which is seen in FIG. 2. The bar 24 and the levers 26 are biased by gravity toward their broken-line positions shown in FIG. 2. A thumb-actuated latch member 30 is pivotally mounted on one of the levers 26 by means of the pin 32, the member 30 having a hook portion 33 for engaging a pin 34 carried by the frame assembly 18, thereby to secure the assembly 22 in its drawer-arresting position, as will appear.

The front panel 36 of the frame assembly 18 is provided with a scooped out portion 38 behind the bar 24 so that a person may easily grip the bar and pull it outwardly from the frame assembly.

A finger 40 (FIG. 2) is rigidly connected to the upper end of the illustrated lever 26 to engage the upper end 42 of a rod 44 which is arranged for generally vertical reciprocation in the frame assembly 18. A spring 46 is arranged to urge the rod 44 upwardly against the finger 40 as suggested by the arrow 48. The lower end 50 of the rod 44 is eccentrically connected to a disc 52 as indicated at 54 so that reciprocation of the rod as indicated by the arrow 56 (FIG. 3) will result in a rocking motion of the disc 52 as indicated by the arrow 58. The disc 52 is rigidly connected to a cam rod 60 so that rocking motion of the eccentric will produce a rocking motion of the cam rod. This cam rod 60 will be discussed in greater detail in conjunction with the various embodiments of our stop system.

The various embodiments of our stop system are arranged so that, when the assembly 22 is in its broken-line position of FIG. 2, the rod 44 is urged upwardly by the spring 46 to rock the cam rod 60 counterclockwise about its axis as viewed in FIG. 3, the cam rod being arranged to actuate means for stopping the drawer 12. Further, the various embodiments of our stop system will stop the drawer 12 in an infinite number of positions along its path of movement.

The assembly 22 is ideally suited for use with drawers slidably mounted in shipboard electronics equipment. That is, if a person is pulling the drawer 12 outwardly from the cabinet 10 and the ship in which the cabinet is mounted begins to list, the person can stop the drawer 12 merely by dropping the bar 24 so that it can move to its broken-line position of FIG. 2. It will be appreciated that a large, heavy drawer could injure maintenance personnel if the drawer were permitted to slide uncontrollably outwardly from the cabinet 10.

Figures 4, 5, 6, 7:
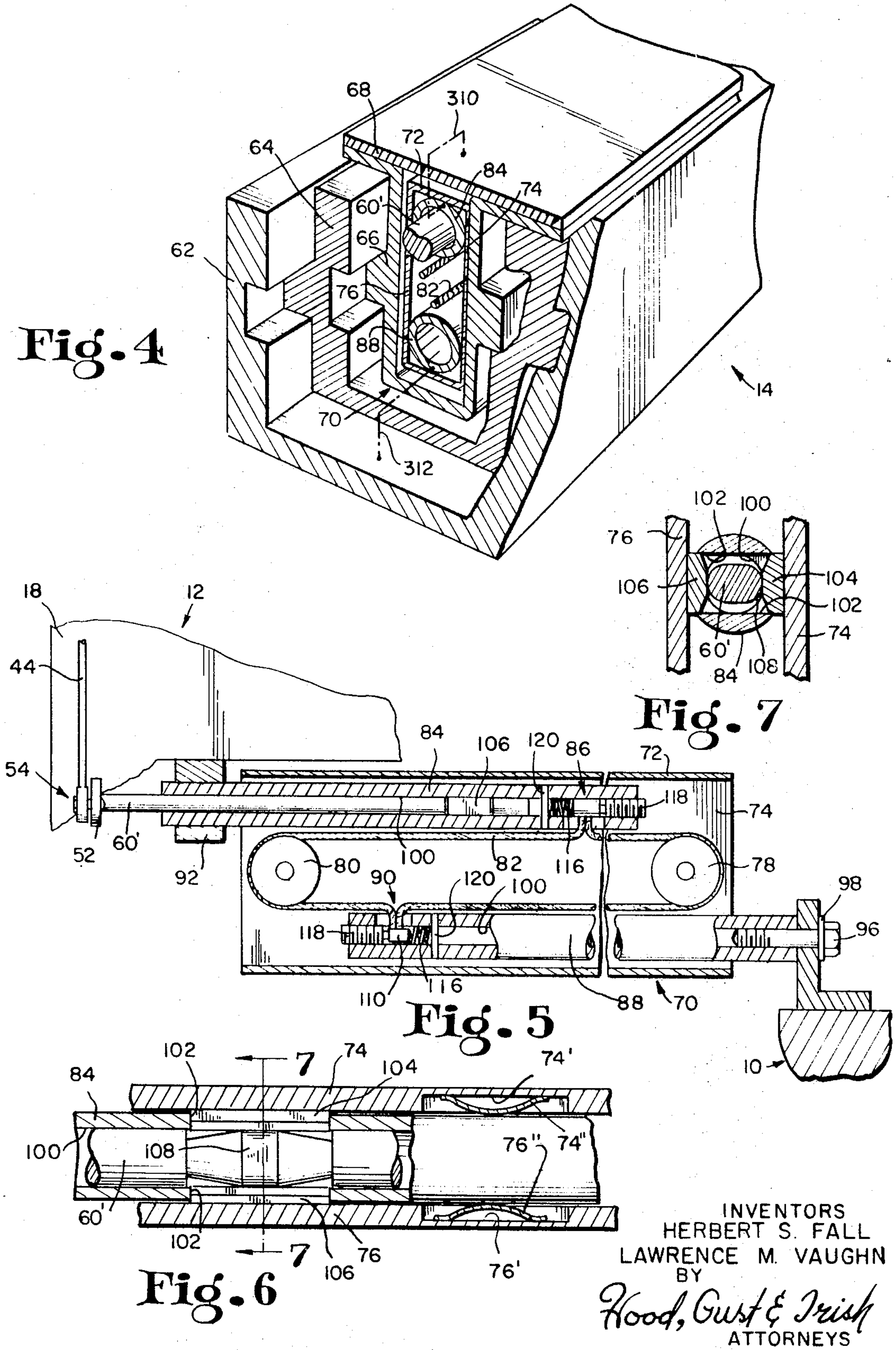
FIG. 4 is an enlarged, perspective view, sectioned along the line 4—4 in FIG. 1, and showing one embodiment of stop means disposed in the center opening of the chassis track which supports the assembly.
FIG. 5 is a fragmentary, longitudinal sectional view showing one embodiment of our stop means, this embodiment comprising a pair of extensible members connected to an endless cable which is trained about a pair of pulleys.
FIG. 6 is an enlarged, sectional view showing a mechanical brake system for the embodiment of FIG. 5.
FIG. 7 is a sectional view taken from FIG. 6 generally along the line 7—7.
Figure 22:
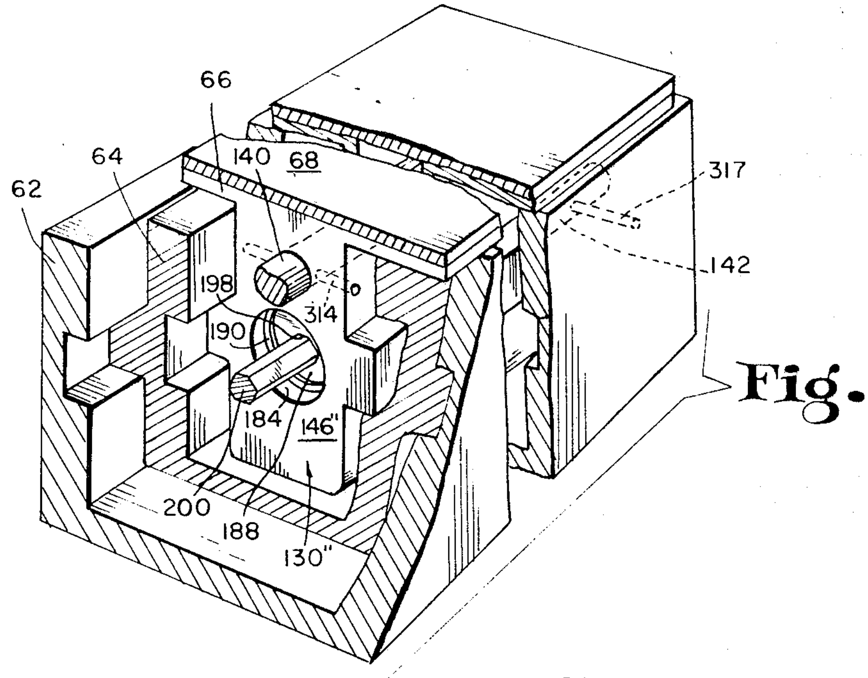
FIG. 22 is a perspective view similar to FIG. 4 except that a hydraulic stop means is shown disposed in the center space of the inner track member.

Referring now to FIGS. 4 and 22, it will be seen that our preferred chassis track 14 comprises an outer U-shaped track member 62, an intermediate U-shaped track member 64 telescopically disposed in the outer track member 62 and an inner U-shaped track member 66 telescopically disposed in the intermediate track member 64. A plate 68 is mounted on the inner track member 66 to extend therealong. The outer track member 62 is preferably mounted on the cabinet 10 and the drawer 12 is preferably mounted on the plate 68 for movement therewith. Anti-friction means (not shown) are provided between the track members 62, 64, 66 to permit free telescopic movement thereof. The plate 68 and the vertical walls of the inner track member 66 define a center opening in the member in which we prefer to place our stop means. This feature of our invention will be discussed hereinafter.

In the following description, like reference numerals indicate like parts.

Referring now to FIGS. 5, 6, 7 and 8, one embodiment of our stop means will be discussed. The stop means 70 (FIG. 5) comprises an elongated enclosure 72 having vertically disposed side walls 74, 76 (FIGS. 4, 6 and 7), rotor means 78 and 80 journalled between the side walls 74 and 76 at opposite ends of the enclosure 72, and endless or loop means 82 trained about the rotor means 78, 80. In the illustrative embodiment of FIG. 5, the rotor means 78, 80 are V-pulleys and the loop means 82 is a wire cable.

A first rod-like member 88 is telescopically disposed in the enclosure 72 and connected to the lower run of the loop means 82 as indicated at 90 and a second rod-like member 84 is telescopically disposed in the enclosure 72 and connected to the upper run of the loop means 82 as indicated at 86. The left-hand end of the member 84 (viewed in FIG. 5) is rigidly connected to a bracket 92 extending downwardly from the drawer 12 and the right-hand end of the member 88 is rigidly connected to a bracket 94 mounted in the cabinet 10. Thus, movement of the drawer 12 will result in movement of the member 84 and the enclosure 72 relative to the member 88. This is true because of the connection between the members 84 and 88 provided by the loop means 82.

In the illustrative embodiment, a screw 96 and washer 98 are utilized to connect the member 88 to the bracket 94.

Each member 84, 88 is provided with an axially extending bore 100. Further, the member 84 is provided with oppositely disposed, transaxially extending openings 102 in the side wall thereof and a brake shoe 104, 106 is loosely carried in each opening 102 and arranged frictionally to engage its adjacent side wall 74, 76.

We have arranged one type of a cam rod 60′ axially in the bore 100 of the member 84, the portion of this cam rod 60′ adjacent the openings 102 providing camming surfaces 108 arranged to engage the shoes 104 and 106 to urge them radially outwardly into engagement with the side walls 74 and 76, respectively. That is, when the cam rod 60′ is rocked to its position illustrated in FIG. 7, the shoes 104 and 106 are urged radially outwardly against the walls 74, 76, respectively, to stop movement of the member 84 relative to the enclosure 72. As stated previously, the cam rod 60′ will be rocked to its position illustrated in FIG. 7 when the assembly 22 is in its broken-line position of FIG. 2. It will be apparent that, when the member 84 is restrained from moving relative to the enclosure 72, the enclosure cannot move relative to the member 88 and, therefore, the drawer 12 is restrained from moving relative to the cabinet 10.

Each connection 86, 90 between the members 84 and 88 and the loop means 82 is preferably made in such a manner that the position of the members relative to the loop means can be adjusted. Specifically, as shown clearly in FIG. 8, each connection 86, 90 comprises a plug 110 connected to the loop means 82 and slidably disposed in the bore 100 of the member 84, 88. The portions 112 of the loop means 82 adjacent the plug 110 extend through a slot 114 in the side wall of the member 84, 86, the slot 114 having an enlarged portion 115 through which the plug 110 can be inserted into the bore 100. On one side of each plug 110 is a relatively strong compression spring 116 and on the opposite side of the plug 110 is a set screw 118 which is threadedly engaged in the end of the member 84, 86. The position of the plug 110 in the bore 100 is adjusted by advancing or retracting the set screw 118 against the tendency of the spring 116. The spring 116 is retained in its position shown in FIG. 8 by means of a pin 120 extending through the bore 100. The spring 116 is preferably made quite strong so that, when the desired position of the plug 110 is achieved, movement of the drawer 12 inwardly and outwardly from the cabinet 10 will not significantly compress it.

In some cases, it may be desirable positively to lock the drawer 12 in its fully retracted position and its fully extended position. Thus, each end portion of each wall 74, 76 may be provided with a cut out 74′, 76′ such as illustrated in FIG. 6. The cut outs 74′, 76′ are proportioned and designed respectively to receive the brake shoes 104, 106 positively to lock the member 84 against movement relative to the walls 74, 76. A small leaf spring 74″, 76″ is disposed in each cut out 74′, 76′ and arranged to urge the brake shoes 104, 106 radially inwardly through the openings 102 when the cam rod 60′ is rocked 90° from its position illustrated in FIG. 7. In the just described embodiment, the brake shoes 104, 106 can frictionally engage the walls 74 and 76 at any point intermediate the cut outs 74′, 76′, respectively, at each end of the walls to stop the drawer 12 at such a point. When the brake shoes 104, 106 are received in their respective cut outs 74′, 76′, the edges of the brake shoes engage the edges of the cut outs to prevent movement of the member 84.

Figure 21:
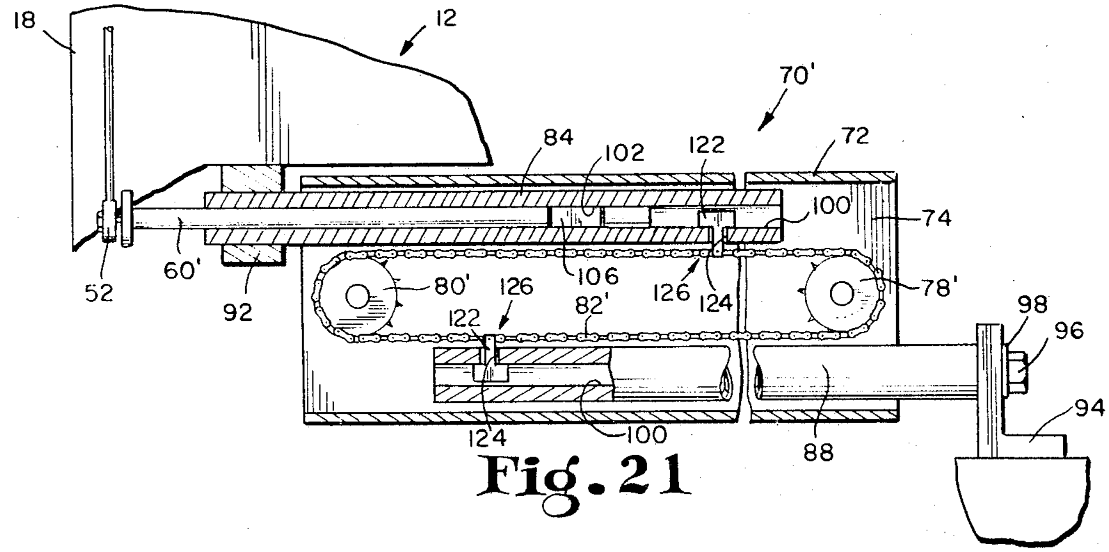
FIG. 21 is a sectional view of an embodiment similar to the embodiment of FIG. 5 except that a chain replaces the cable of FIG. 5 and is trained about a pair of sprockets.

Referring now to FIG. 21, another embodiment of our stop means 70′ will be discussed. This stop means 70′ is similar to the stop means 70 except that the loop means comprises a chain 82′ trained about a pair of sprockets 78′, 80′. Further, each member 84, 88 is connected to the chain 82′ by means of a bracket 122 carried in the bore 100 of the member, the bracket 122 having a portion extending through an opening 124′ in the side wall of the member to be connected to a link of the chain 82′ as indicated at 126.

Figure 23:
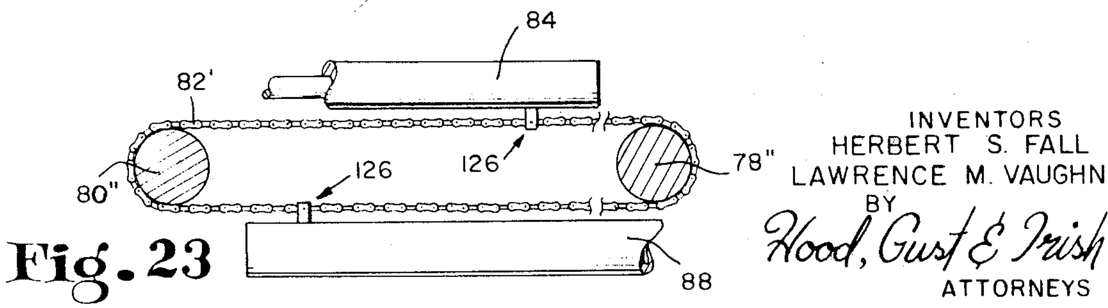
FIG. 23 is a sectional view showing a chain trained about a pair of stationary pins.

Although we have illustrated sprockets 78′, 80′, in some cases, it is sufficient merely to train the chain 82′ about pulleys such as those illustrated in FIG. 5. Further, as illustrated in FIG. 23, it is sufficient to train the chain 82′ about a pair of pins or arbors 78″, 80″. The pins 78″, 80″ are preferably secured against rotation to the enclosure 72 (not shown in FIG. 23).

Figure 10:
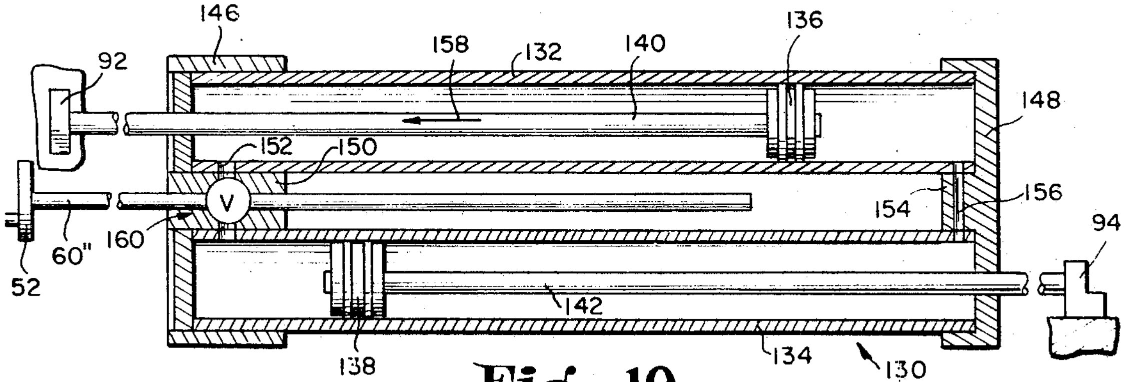
FIG. 10 is a sectional view showing another embodiment of our invention, this embodiment comprising a pair of hydraulic cylinders connected at their ends so that, when the cylinders are filled with fluid, movement of a piston in one of the cylinders causes movement of the cylinders relative to the piston telescopically disposed in the other cylinder.
Figures 11, 12:
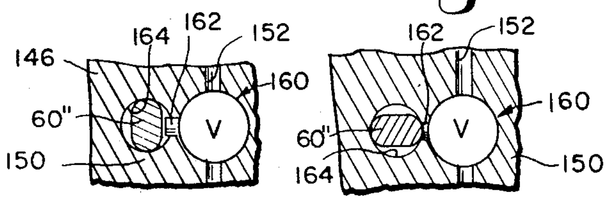
FIG. 11 and FIG. 12 are fragmentary, sectional views, slightly enlarged, showing the mode of operation of a valve means for preventing fluid flow between the cylinders of FIG. 10.

Referring now to FIGS. 10, 11 and 12, another embodiment of our stop means, indicated generally by the reference numeral 130, will be discussed. The stop means 130 comprises a pair of cylinders 132, 134, and a piston 136, 138 and its piston rod 140, 142 telescopically disposed in each cylinder. The piston rod 140 corresponds to the previously discussed member 84 and is connected to the bracket 92 for movement therewith and the piston rod 142 corresponds to the previously discussed member 88 and is connected to the bracket 94 on the cabinet 10. The cylinders 132, 134 are held in a parallel, side by side relationship by means of the end members 146, 148.

The end member 146 includes a portion 150 defining a fluid passage 152 between the first adjacent ends of the cylinders 132 and 134. The end member 148 also includes a portion 154 defining a fluid passage 156 between the second adjacent ends of the cylinders 132 and 134. When the cylinders 132 and 134 are filled with a fluid, movement of the piston 136 in the direction of the arrow 158 causes movement of the two cylinders 132 and 134 in the direction of the arrow 158 relative to the piston 138. Specifically, when the piston 136 is moved in the direction of the arrow 158, fluid in the cylinder 132 is forced through the passage 152 into the left-hand end of the cylinder 134 as viewed in FIG. 10 to move the cylinders in the same direction, thus forcing fluid from cylinder 134 to flow through passage 156 into the right-hand end of cylinder 132. When the piston 136 is moved in the direction opposite to the arrow 158, fluid in the cylinder 132 is forced through the passage 156 into the right-hand end of cylinder 134 to move the cylinders in a direction opposite to the arrow 158 relative to the piston 138, thus forcing fluid from cylinder 134 to flow through passage 152 into the left-hand end of cylinder 132. Obviously, if fluid flow between the cylinders is prevented, the drawer will be arrested.

In order to stop this relative movement of the pistons 136 and 138, we have provided a valve means 160 arranged to block the passage 152 to prevent fluid flow between the cylinders 132 and 134. The valve means 160 (FIGS. 11 and 12) comprises a conventional valve plunger 162 arranged alternatively to open and close the passage 152. In order to actuate this plunger 162, we have provided a cam rod 60″ arranged for reciprocation relative to the plunger. The cam rod 60″ is telescopically disposed in a cylindrical opening 164 in the portion 150 of the member 146 and arranged for rocking movement about its axis in the opening. As shown in FIGS. 11 and 12, the plunger 162 is engaged with the cam rod 60″ and the cross-sectional shape of the cam rod is such that, when the rod is in its position shown in FIG. 11, the passage 152 is open and, when the cam rod is rocked to its position shown in FIG. 12, the passage 152 is closed. Again, the cam rod 60″ is rocked about its axis by movement of the assembly 22. It will be clear that the same effect may be achieved by providing valve means dominating the passage 156 instead of, or in addition to, the illustrated valve means dominating the passage 152.

Figure 13:
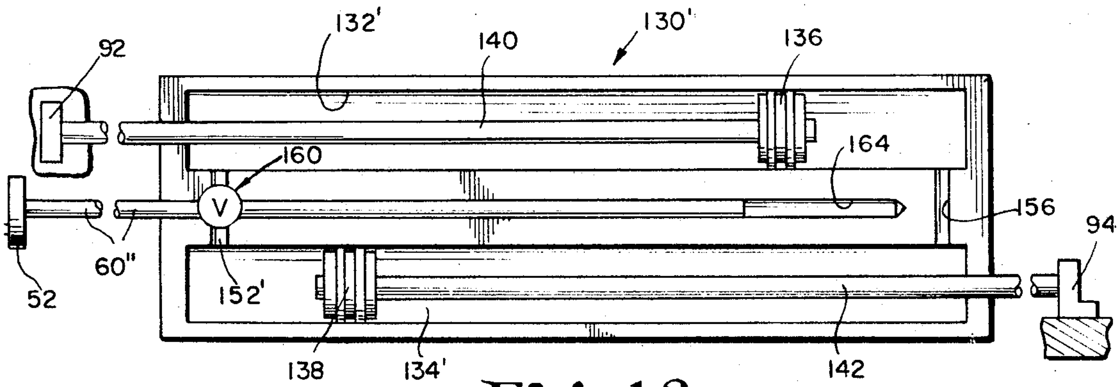
FIG. 13 is a longitudinal view of a means similar to that shown in FIG. 10, except that the cylinders are formed by machining two solid metal blocks to form half-cylinders and then welding or otherwise securely fastening the blocks together.

Referring now to FIG. 13, another embodiment of our stop means will be discussed. The embodiment of FIG. 13, indicated generally by the reference numeral 130′, is similar to the embodiment 130 shown in FIG. 10 except that its cylinders 132′ and 134′, its passages 152′ and 156′, and its cylindrical opening 164′ are provided by machining or otherwise forming half-cylindrical openings in two solid metal blocks, only one of which is, shown, the blocks being allochirally related so that, when they are assembled together, the cylinders 132′ and 134′, the passages 152′ and 156′ and the cylindrical opening 164′ are formed.

Figure 17:
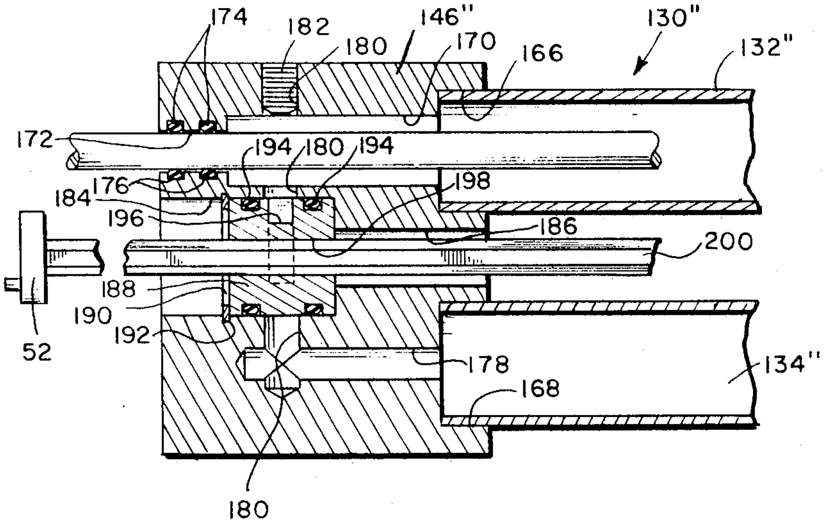
FIG. 17 is a fragmentary, sectional view showing a preferred means for providing a fluid connection between adjacent ends of two cylinders.
Figure 18:
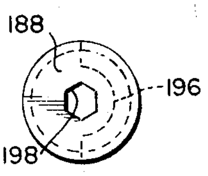
FIG. 18 is a view of a valve member arranged alternatively to open and close the fluid passage connecting the ends of the two cylinders in FIG. 17.

Referring now to FIG. 17, another embodiment of our stop means will be discussed. This embodiment, indicated generally by the reference numeral 130″, comprises a pair of cylinders 132″ and 134″, the first adjacent ends of which are connected by means of the member 146″. The member 146″ is formed with a pair of spaced apart bores 166 and 168 for receiving the ends of the cylinders 132″ and 134″, the bore 166 having a first reduced portion 170 and a second reduced portion 172 providing an opening entirely through the member 146″. A pair of conventional O-ring seals 174 is disposed in a pair of peripherally extending grooves 176 in the bore portion 172, the seals 174 being arranged to engage peripherally the piston rod 140 to prevent leakage of fluid through the bore 172. The bore 168 is formed with a reduced portion 178 extending inwardly of the member 146″ as shown in FIG. 17.

The member 146″ is also formed with a vertically extending passage 180 which is in communication with the bore portions 170 and 178 and the upper end of which is threaded to receive a plug 182.

The member 146″ is also formed with a bore 184, the axis of which is parallel to and spaced between the axes of the bores 166 and 168. This bore 184 is also provided with a reduced portion 186 providing an opening entirely through the member 146″. A cylindrical valve plug 188 is snugly but rockably received in the bore 184 and held in its axially innermost position by means of a snap ring 190 disposed in a peripherally extending groove 192. O-ring seals 194 are disposed peripherally about the plug 188 on opposite sides of the passage 180. The plug 188 is formed with a port 196 extending about a portion of its periphery. In the illustrative embodiment, the port 196 extends approximately 180 degrees about the periphery of the plug 188. Further, the bore 184 is in communication with the passage 180 so that the plug 188 can be rocked about its axis to one position which will permit the flow of fluid through the passage 180 and the port 196 or to another position which will prevent the flow of fluid through the passage. Specifically, when the plug 188 is rocked so that the ends of its port 196 are aligned with the passage 180, fluid can flow through the passage and the port. When the plug 188 is rocked to any other position, such fluid flow will be stopped.

In the illustrative embodiment, the plug 188 is provided with a centrally disposed, non-circular opening 198 which receives telescopically a rod 200 of corresponding cross-section, whereby rocking movement of the rod will produce a corresponding movement of the plug 188. The left-hand end of the rod 200 (FIG. 17) is connected to the disc 52 so that the above described rocking movement of the disc will produce a rocking movement of the rod. In the embodiment of FIG. 17, therefore, the rod 200 corresponds to the previously described cam rod 60.

The remote ends of the cylinders 132″ and 134″ are joined by a suitable end member which may be similar to the member 148 of FIG. 10.

Figure 14:
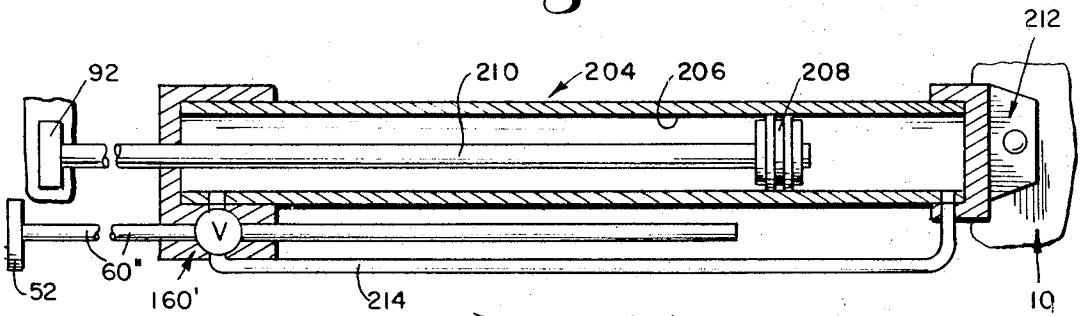
FIG. 14 is a sectional view of still another embodiment of our stop means, this embodiment comprising a single cylinder and a single piston with means providing a fluid connection between the ends of the cylinder and valve means for stopping the flow of fluid from one end of the cylinder to the other.

Referring now to FIG. 14, still another embodiment of our stop means will be discussed. This embodiment, indicated generally by the reference numeral 204, comprises a single cylinder 206 in which a piston 208 and piston rod 210 are telescopically disposed. The piston rod 210 is connected to the bracket 92 of the drawer 12 for movement therewith and the cylinder 206 is connected to the cabinet 10 as indicated at 212. A conduit 214 is connected between the ends of the cylinder 206 so that, when the cylinder is filled with fluid, movement of the piston 208 causes fluid to flow through the conduit 214. In order to stop movement of the piston 208 relative to the cylinder 206, we have provided a valve means 160′ connected in the conduit 214 and arranged to open and close the conduit. The valve means 160′ corresponds to the previously discussed valve means 160 and is operated by a cam rod 60″ as discussed in conjunction with the FIGS. 11 and 12.

Figure 15:
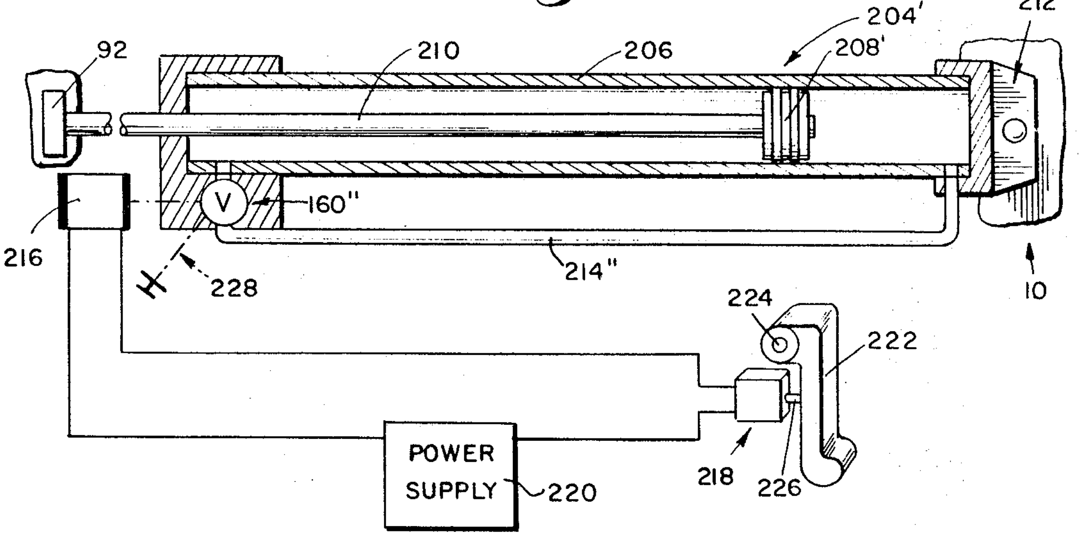
FIG. 15 is a sectional view showing the hydraulic system of FIG. 14 with a solenoid for opening and closing the valve means.

Referring now to FIG. 15, yet another embodiment of our stop means will be discussed. This embodiment, indicated generally by the reference numeral 204′, is similar to the embodiment of FIG. 14 except that its valve means 160″ is operated by a solenoid 216. We have provided a switch means 218 arranged to connect the solenoid 216 across a power supply 220, thereby to energize the solenoid to operate the valve means 160″. Preferably, the switch means 218 is disposed adjacent a handle 222 which is mounted on the drawer 12 for pivotal movement about a horizontal axis 224. When the handle 222 is in its vertical position, as illustrated in FIG. 15, the actuator 26 of the switch means 218 is engaged by the handle to hold the switch means in its open position. When the handle is pivoted away from the actuator 226, the switch means 218 is closed to energize the solenoid 216. The valve means 160″ is a conventional normally-closed valve. That is, fluid cannot flow through the conduit 214″ unless the solenoid 216 is energized to open the valve means 160″. This feature provides a safety factor in that, if there is a power failure, the valve means 160″ will remain closed and, therefore, the drawer 12 will be restrained from movement relative to the cabinet 10.

In order to permit movement of the drawer 12 when there is a power failure, we have provided manually-operable means 228 for opening the valve 160″. It is conventional to provide such manually-operable means for opening valves and, for that reason, it is not necessary to discuss, in detail, the valve means 160″ or the means 228.

It will be apparent that the electrical system illustrated in FIG. 15 will replace the mechanical system illustrated in FIG. 2. It will further be apparent that the handle 222 may be replaced with a simple push button for operating the switch means 218.

Figure 16:
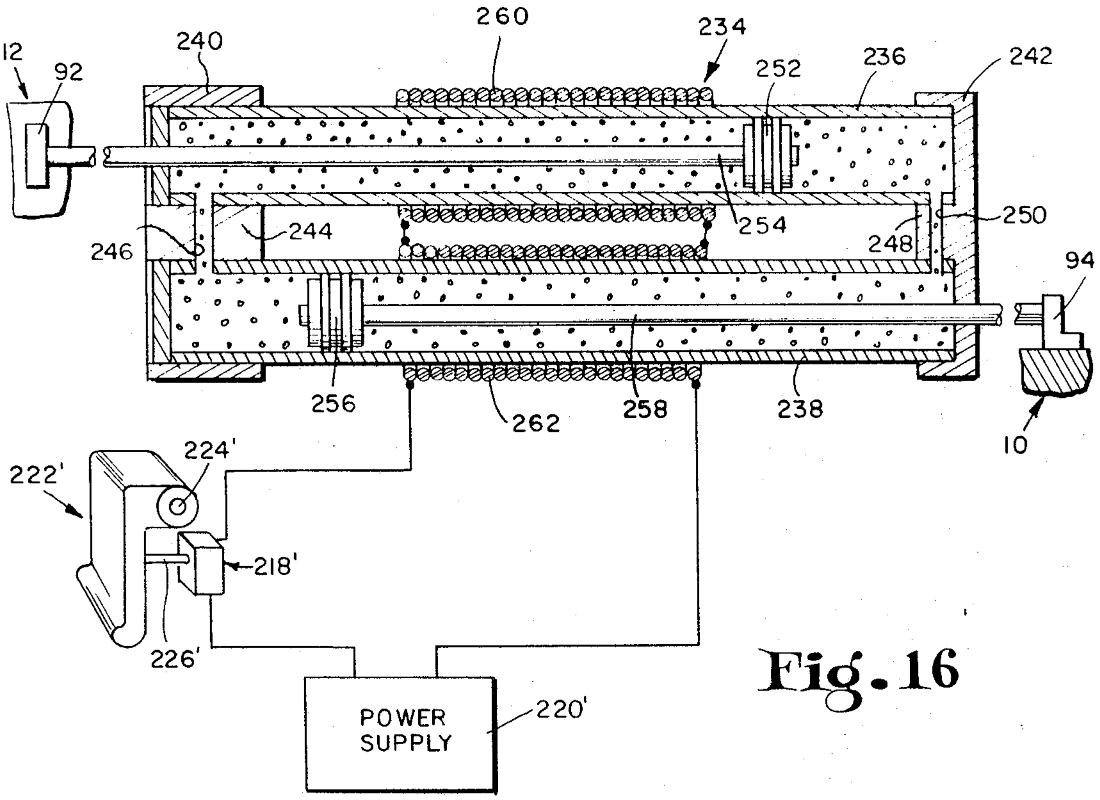
FIG. 16 is a sectional view showing another double-cylinder arrangement with the cylinders containing a hydraulic fluid filled with magnetic metal particles, coils disposed peripherally about each cylinder and switch means arranged to energize the coils.

Referring now to FIG. 16, still another embodiment of our stop means will be discussed. This embodiment, indicated generally by the reference numeral 234, comprises a pair of cylinders 236 and 238 disposed in a generally parallel, side by side relationship. The cylinders 236 and 238 are held in this relationship by means of end members 240 and 242. The end member 240 includes a portion 244 providing a fluid passage 246 connecting the first adjacent ends of the cylinders 236 and 238 and the end member 242 includes a portion 248 providing a passage 250 connecting the second adjacent ends of the cylinders. A piston 252 and its piston rod 254 are telescopically disposed in the cylinder 236 and a piston 256 and its piston rod 258 are telescopically disposed in the cylinder 238. The piston rod 254 is connected to the bracket 92 on the drawer 12 and the piston rod 258 is connected to the bracket 94 on the cabinet 10. Thus, movement of the piston 252 in the cylinder 236 causes movement of the cylinder 238 relative to the piston 256. This action is the same as that described in conjunction with the stop means 130 of FIG. 10.

In order to stop such relative movement of the pistons 252 and 256, we have provided coil means 260, 262 disposed peripherally about the cylinders 236, 238, respectively, and have filled the cylinders with a hydraulic fluid. This hydraulic fluid is filled with magnetic metal particles and the coil means 260, 262 are effective, when energized, to arrange the magnetic particles in such a manner as to prevent movement of the pistons 252 and 256 in their respective cylinders. This manner of magnetically arranging particles carried in a fluid is well known and need not be discussed in this description.

The inner walls of the cylinders 236, 238 may be scored or peripherally grooved so that, when the coil means 260, 262 are energized, the metal particles will engage the scored or grooved surfaces more positively to prevent movement of the pistons 252, 256. Specifically, the particles will extend into the scoring or grooving to resist by shear forces the movement of the pistons.

While we have shown and discussed electro-magnetic means for arranging the metal particles, it will be understood that permanent magnet means may be selectively moved into position to arrange the metal particles in such a manner as to prevent movement of the pistons 252, 256. Such a permanent magnet means could be operatively connected to a cam rod 60 and arranged to be moved thereby into a position which will so arrange the metal particles.

We have provided a switch means 218′ arranged to connect the coil means across a power supply 220′, thereby to energize the coil means 260, 262. The switch means 218′ is preferably operated by movement of a handle 222′ and is closed when its handle is in its illustrated vertical position.

Figure 19:
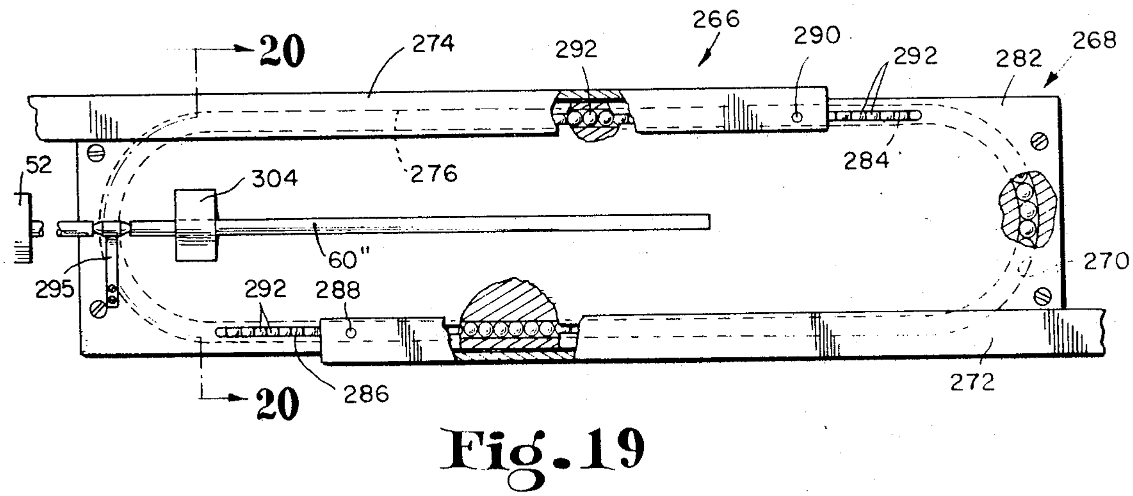
FIG. 19 is a fragmentary, sectional view of still another embodiment of our stoup means, this embodiment comprising means defining a closed loop track completely filled with balls and a pair of members, each member carrying means extending into the track into the path of the balls so that movement of one member causes movement of the track defining means relative to the other member.
Figure 20:
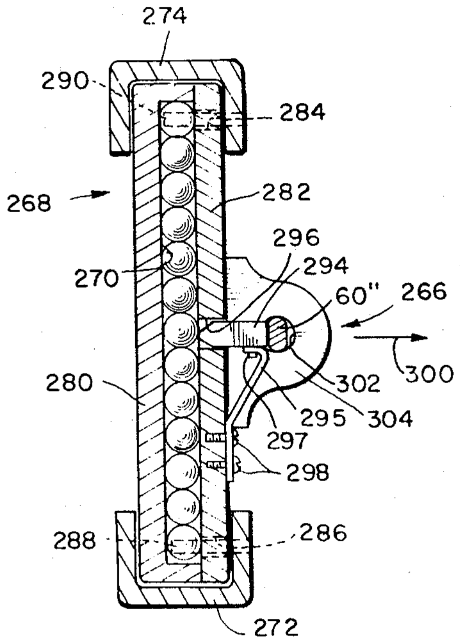
FIG. 20 is an enlarged, sectional view taken from FIG. 19 generally along the line 20—20 and showing means for stopping movement of the balls in the track.

Referring now to FIGS. 19 and 20, a further embodiment of our stop means will be discussed. This embodiment indicated generally by the reference numeral 266, comprises means 268 defining a closed-loop track 270, a first rod-like member 272 and a second rod-like member 274. The member 272 is adapted to be connected to the cabinet 10 and the member 274 is adapted to be connected to the drawer 12. The upper run 276 of the track 270 is generally parallel to the member 274 and the lower run 278 of the track 270 is generally parallel to the member 272. The track defining means 268 comprises a member 280 in which a groove corresponding to the track 270 is formed and a cover plate 282 (FIG. 20) for covering the groove. The cover plate 282 is provided with a slot 284 extending alongside the upper run 276 and a slot 286 extending alongside the lower run 278. The member 272, which is preferably a U-shaped member telescopically receiving the lower edge of the track defining means 268, carries a pin 288 which extends through the slot 286 into the lower run 278, and the member 274, which is preferably an inverted U-shaped member telescopically receiving the upper edge of the track defining means 268, carries a pin 290 which extends through the slot 284 into the upper run 276.

The track 270 is completely filled with metal balls 292 so that movement of one ball in the track produces a corresponding movement of all the balls in the track. The pins 288 and 290 extend into the path of movement of the balls 292 and, consequently, movement of the member 274 will produce movement of the track defining means 268 relative to the member 272. It will be understood that the balls 292 function in the same maner as the above-described loop means 82. That is, the balls 292 serve operatively to connect the members 272 and 274.

In order to stop movement of the member 274 relative to the member 272, we have provided a wedge 294 arranged to move through an opening 296 in the plate 282, but confined against movement longitudinally relative to the plate 282. A leaf spring 295 is connected to the wedge 294 as indicated at 297 and to the plate 282 as indicated at 298, the spring being arranged to urge the wedge 294 in the direction of the arrow 300 out of the path of the balls 292. A cam rod 60″ is telescopically disposed in a cylindrical opening 302 formed in a member 304 attached to the plate 282. The cam rod 60″, which is connected to the disc 52 for rocking movement therewith, is arranged to engage the wedge 294 so that, when the cam rod is rocked about its axis, the wedge will be urged into the path of the balls 292.

Referring again to FIGS. 4 and 22, it will be seen that we have illustrated our stop means in the center opening of the inner track member 66. Specifically, in FIG. 4, we have illustrated the stop means 70 in the center opening and in FIG. 22, we have illustrated the stop means 130″ in the center opening.

Further, in FIG. 4, we show a broken line 310 indicating that the member 84 is connected to the inner track member 66 for movement therewith and a broken line 312 indicating that the member 88 is connected to the outer track member 62. In FIG. 22, we show the piston rod 140 connected to the inner track member 66 by means of a pin 314 which extends transaxially through openings in the piston rod and track member 66 and we show the piston rod 142 connected to the outer track member 62 by means of a pin 316 which extends transaxially through openings in the piston rod 142 and member 62.

Referring again to FIG. 9, it will be seen that we have illustrated our stop means 70 extending alongside the drawer 12′ and arranged to stop the drawer in any position relative to the cabinet 10′. The drawer 12′ is slidably mounted on track means, not shown, which are disassociated from the stop means 70. In the embodiment of FIG. 9, we show an actuator rod 44′ connected to the disc 52, and actuator rod 44′ extending generally horizontally along the front of the drawer 12′. A spring 46′ is arranged to urge the rod 44′ in the direction of the arrow 314. A cam member 317 is mounted on the handle 222′ and arranged so that, when the handle is pivoted in the direction of the arrow 318, the cam member will move the rod 44′ against the urging of the spring 46′ to rock the cam rod 60′.

Finally, we point out that the various embodiments of our stop means will stop the drawer 12 in an infinite number of positions along its path of movement. This is in contrast to stop means which stop a movement element in a selected number of positions along its path of movement.

What is claimed is:

1. Apparatus of the character described comprising a support structure, platform means, track means mounting said platform means for reciprocation relative to said support structure, handle means for moving said platform means, means mounting said handle means for movement between first and second positions on said platform means, means for stopping said platform means in any position along its path of movement, said stopping means comprising first means connected to said support structure and second means connected to said platform means for movement therewith, said first and second means extending generally parallel to said track means, third means providing an operative connection between said first and second means, said third means including fourth means for preventing relative movement between said first and second means thereby stopping said platform means, means, for actuating said fourth means to stop said second means, said actuating means being operatively connected between said handle means and said fourth means so that, when said handle means is in said first position, said fourth means will stop said second means, said first means comprising a first rod-like member, said second means comprising a second rod-like member, said third means comprising an elongated frame means extending alongside said members, rotor means journalled at each end of said frame means, and loop means trained about said rotor means, said first member being connected to one run of said loop means and said second member being connected to the opposite run of said loop means whereby movement of said second member produces a corresponding movement of said frame means relative to said first member, said second member being provided with an axially extending bore and a transaxially extending opening in its wall in communication with said bore, and said fourth means comprising a brake shoe loosely carried in said opening and arranged frictionally to engage said frame means, and a rod axially disposed in said bore and arranged for rocking movement about its axis therein, the portion of said rod adjacent said opening providing a cam surface for engaging said brake shoe and, when said rod is rocked about its axis, urging said brake shoe against said frame means, and said actuating means comprising means for rocking said rod.

2. Apparatus of the character described comprising a support structure, platform means, track means mounting said platform means for reciprocation relative to said support structure, handle means for moving said platform means, means mounting said handle means for movement between first and second positions on said platform means, means for stopping said platform means in any position along its path of movement, said stopping means comprising first means connected to said support structure and second means connected to said platform means for movement therewith, said first and second means extending generally parallel to said track means, third means providing an operative connection between said first and second means, said third means including fourth means for preventing relative movement between said first and second means thereby stopping said platform means, means for actuating said fourth means to stop said second means, said actuating means being operatively connected between said handle means and said fourth means so that, when said handle means is in said first position, said fourth means will stop said second means, said first means comprising a first rod-like member, said second means comprising a second rod-like member, said third means comprising an elongated frame means extending alongside said members, rotor means journaled at each end of said frame means, and loop means trained about said rotor means, said first member being connected to one run of said loop means and said second member being connected to the opposite run of said loop means whereby movement of said second member produces a corresponding movement of said frame means relative to said first member, said loop means being a chain and said rotor means being a sprocket.

3. Apparatus of the character described comprising a support structure, platform means, track means mounting said platform means for reciprocation relative to said support structure, handle means for moving said platform means, means mounting said handle means for movement between first and second positions on said platform means, means for stopping said platform means in any position along its path of movement, said stopping means comprising first means connected to said support structure and second means connected to said platform means for movement therewith, said first and second means extending generally parallel to said track means, third means providing an operative connection between said first and second means, said third means including fourth means for preventing relative movement between said first and second means thereby stopping said platform means, means for actuating said fourth means to stop said second means, said actuating means being operatively connected between said handle means and said fourth means so that, when said handle means is in said first position, said fourth means will stop said second means, said first means comprising a first rod-like member, said second means comprising a second rod-like member, said third means comprising an elongated frame means extending alongside said members, rotor means journalled at each end of said frame means, and loop means trained about said rotor means, said first member being connected to one run of said loop means and said second member being connected to the opposite run of said loop means whereby movement of said second member produces a corresponding movement of said frame means relative to said first member, said frame means providing an elongated enclosure telescopically receiving said members, said second member being provided with an axially extending bore and oppositely disposed transaxially extending openings through its side wall and in communication with said bore, and said fourth means comprising a brake shoe loosely received in each of said openings and arranged frictionally to engage opposing side walls of said enclosure, and a rod axially disposed in said bore and arranged for rocking movement about its axis therein, the portion of said rod adjacent said openings providing camming surfaces for engaging said brake shoes and, when said rod is rocked about its axis, urging them outwardly against said opposing side walls, and said actuating means comprising means for rocking said rod.

4. An apparatus as in claim 3 wherein said track means comprises an outer U-shaped track member, an intermediate U-shaped track member telescopically disposed within said outer member, and an inner U-shaped track member telescopically disposed within said intermediate track member, said enclosure being telescopically received in the center opening of said inner track member, said inner track member being connected to said platform means and said outer track member being connected to said support structure, said first member being connected to said outer track member and said second member being connected to said inner track member.

References Cited

UNITED STATES PATENTS

| | | | |
|---|---|---|---|
| 363,647 | 5/1887 | Knaus | 312—331 |
| 403,841 | 5/1889 | Homan | 248—412 |
| 439,411 | 10/1890 | Luetke | 248—412 |
| 2,667,400 | 1/1954 | Wotring | 312—331 |
| 3,189,313 | 6/1965 | Burns et al. | 248—429 |
| 3,367,732 | 2/1968 | Beye | 312—333 X |
| 3,381,927 | 5/1968 | Stamates | 248—429 |

JAMES T. McCALL, Primary Examiner

US. Cl. X.R.

312—215, 333; 308—3.6